(12) United States Patent
Modarresi

(10) Patent No.: US 10,475,067 B2
(45) Date of Patent: Nov. 12, 2019

(54) ATTRIBUTING CONTRIBUTIONS OF DIGITAL MARKETING CAMPAIGNS TOWARDS CONVERSIONS

(71) Applicant: Adobe Inc., San Jose, CA (US)

(72) Inventor: Kourosh Modarresi, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 463 days.

(21) Appl. No.: 15/234,118

(22) Filed: Aug. 11, 2016

(65) Prior Publication Data

US 2018/0047049 A1 Feb. 15, 2018

(51) Int. Cl.
*G06Q 30/02* (2012.01)
*G06N 7/00* (2006.01)

(52) U.S. Cl.
CPC ..... *G06Q 30/0246* (2013.01); *G06Q 30/0201* (2013.01); *G06Q 30/0242* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 2014/0257966 A1* | 9/2014 | Chittilappilly | G06Q 30/0241 705/14.41 |
| 2016/0027041 A1* | 1/2016 | Zhong | H04L 67/22 705/14.45 |
| 2016/0098735 A1* | 4/2016 | Sinha | G06O 30/0202 705/7.31 |
| 2017/0337276 A1* | 11/2017 | Obenzinger | G06Q 30/08 |

OTHER PUBLICATIONS

Shao, "Data-driven Multi-touch Attribution Models," In Proceedings of the 17th ACM SIGKDD international conference on Knowledge discovery and data mining, 2011, pp. 258-264.*
"Independent Research Firm Cites ClearSaleing as a Leader in Attribution Management", May 3, 2012, 3 pages.
Chandler-Pepelnjak,"Measuring ROI Beyond the Last AD", The Nielsen Company. Nielsen's Three Screen Report, May 2008, 6 pages.
Hastie,"BOOK—The Elements of Statistical Learning: Data Mining, Inference, and Prediction", Springer-Verlag, ISBN: 0387848576, 2009, 758 pages.

* cited by examiner

*Primary Examiner* — Jamie R Kucab
(74) *Attorney, Agent, or Firm* — SBMC

(57) ABSTRACT

Methods and systems for attributing contributions to digital marketing campaigns in achieving an action are described. In one or more implementations, first, second, and third order probabilities of a user taking the action are computed for each of a plurality of campaigns of a campaign path. Based on the probabilities, contributions are attributed to the campaigns of the campaign path in achieving the action.

20 Claims, 5 Drawing Sheets

ATTRIBUTING CONTRIBUTIONS OF DIGITAL MARKETING CAMPAIGNS TOWARDS CONVERSIONS

BACKGROUND

Digital marketing campaigns such as emails, advertisements included on webpages and so on, are typically provided to users in order to increase a likelihood that a user will interact with the digital marketing campaign or another digital marketing campaign toward purchase of a product or service. This is referred to as conversion. In one example of use of digital marketing campaigns and conversion, a user may be exposed to a series of emails relating to the product or service. If the emails are of interest to the user, the user may navigate to webpages that contain more information about the product or service that is a subject of the emails, functionality usable to purchase the product or service, and so forth. Each of these selections thus involves conversion of interaction of the user with respective digital marketing campaigns into other interactions with other digital marketing campaigns and/or even purchase of the product or service. Thus, configuration of the emails in a manner that is likely to be of interest to the users increases the likelihood of conversion of the users regarding the product or service.

One of the advantages of digital marketing campaigns is that a user response may be recorded and observed promptly and accurately. This enables digital marketing campaigns to be analyzed for their effectiveness, i.e. how likely the digital marketing campaigns result in conversions. By allocating money or resources to particular digital marketing campaigns that have been shown to be more effective, a company may be able to increase sales, achieve more customers, receive more webpage views, and so on.

Conventional techniques for establishing digital marketing campaign effectiveness, however, often credit the latest digital marketing campaign exposed to a user as causing conversion of the good or service. However, in practice previous digital marketing campaigns that are exposed to the user may also have an effect on conversion, which is ignored in conventional techniques. Accordingly, these conventional techniques often lead to unsatisfactory results through failure to address an effect of other digital marketing campaigns on resulting conversions.

SUMMARY

Techniques and systems are described to attribute contributions to digital marketing campaigns, or campaigns, in achieving an action, such as a conversion of a good or service. A digital medium environment is configured to collect historical data for digital marketing campaigns (also referred to simply as "campaigns" in the following) and users who have been exposed to the respective digital marketing campaigns and whether those users made conversions. To begin, a set of campaigns, also referred to as a campaign path or path, is identified for analysis that has been exposed to one or more of the users. For example, a path may be identified as campaigns "w," "x," "y," and "z." The historical data is parsed to determine users who have been exposed to campaigns "w," "x," "y," and "z" and whether or not that exposure resulted in conversions by the users.

A first order probability of conversion is determined for each campaign of the path. The first order probability represents a likelihood of conversion responsive to exposure to a particular campaign. For the example above, a first order probability of campaign "w" may comprise a probability of conversion when campaign "w" is in the path of the users.

Then, a second order probability of conversion is determined for each campaign of the path. The second order probability represents a likelihood of conversion responsive to exposure to a particular campaign and another campaign of the path. For the example above, a second order probability of campaign "w" may comprise a probability of conversion when campaign "w" is in the path of the users along with any of "x," "y," and "z."

Next, a third order probability of conversion is determined for each campaign of the path. The third order probability represents a likelihood of conversion responsive to exposure to a particular campaign and another two campaigns of the path. For the example above, a third order probability of campaign "w" may comprise a probability of conversion when campaign "w" is in the path of the users along with any of two of "x," "y," and "z."

Campaign contributions are then attributed to each of the campaigns based on the first, second, and third order probabilities for the respective campaigns. The campaign contributions are indicative of how effective each of the campaigns were in achieving the conversion. Continuing with the above example, campaign contributions may be determined to be 0.5, 0.3, 0.1, and 0.1 for "w," "x," "y," and "z," respectively, and output in a user interface such that a user, marketer, or campaign manager may be able to leverage the information. In this case, campaign "w" would be the most likely candidate to allocate resources to in the future due to it being attributed the highest campaign contribution.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
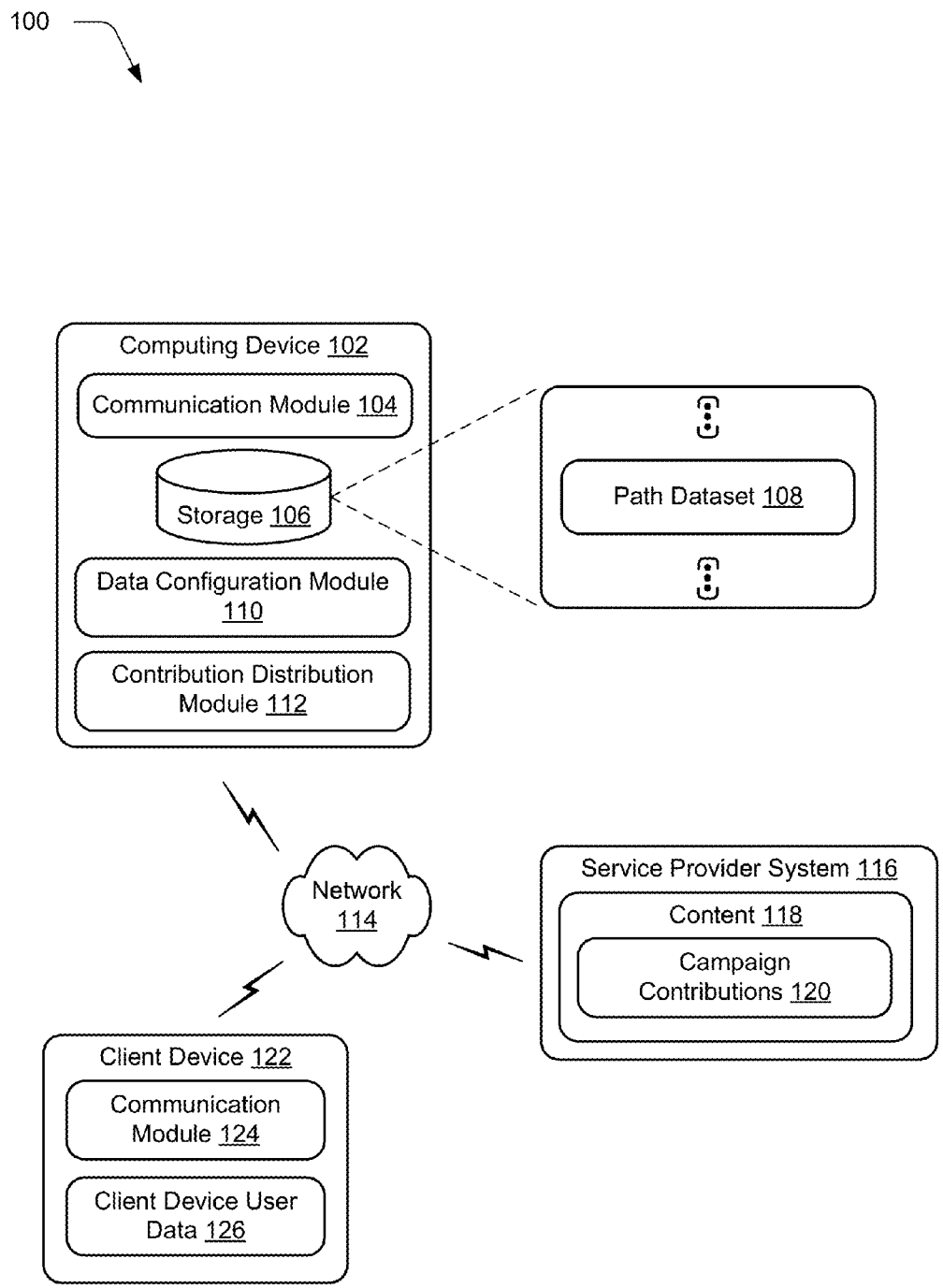
FIG. 1 is an illustration of an environment in an example implementation that is operable to attribute contributions to campaigns in achieving conversion as described herein.

Conventional techniques that are utilized to assess effectiveness of digital marketing campaigns may lack sufficient accuracy to be useful as a basis to control implementation of future campaigns. Digital marketing campaigns are also referred to simply as "campaigns" in the following. As previously described, this may be caused by an inability of these conventional techniques to address contributions of campaigns other than the latest campaign of a path to conversion of a good or service. The lack of accuracy may result in overestimating the impact of the latest campaign, which can lead an inaccurate allocation of resources.

Techniques and systems are described that attribute contributions to individual campaigns of a path toward achievement of conversions of products or services. A campaign contribution is indicative of a relative effectiveness of the associated campaign towards conversion when compared with campaign contributions for other campaigns of a path. For example, a path may include emails "a," "b," and "c" that are sent to users and campaign contributions "PCa," "PCb," "PCc" may be attributed to emails "a," "b," and "c," respectively, in contributing to conversion. A higher relative campaign contribution may indicate that the associated campaign is more effective than other campaigns of the path in achieving conversion of a good or service.

Campaign contributions are based on probabilities of conversion when users are exposed to respective campaigns. For example, a first order probability is indicative of a probability of conversion when a user is exposed to a single campaign. A second order probability is indicative of a probability of conversion when the user is exposed to the campaign and another campaign. Third order probabilities are indicative of a probability of conversion when the user is exposed to the campaign and another two campaigns. By utilizing first, second, and third order probabilities, campaign contributions are attributed with increased accurately and reliability that is not available with previous techniques that relied solely on a contribution of the most recent digital marketing campaign on conversion. A variety of other examples are also contemplated as further described below.

In the following discussion, campaigns refer to content provided to users related to marketing activities performed, such as to increase awareness of and conversion of products or services made available by a service provider, e.g., via a website. Accordingly, campaigns may take a variety of forms, such as emails, advertisements included in webpages, webpages themselves, movie advertisements, "pop-ups," and so forth. Conversions refer to an action responsive to one or more of the campaigns, which can be, opening of emails, clicking on links within emails, navigating to a webpage, purchasing a product or service, upgrading software, etc.

An example environment is first described that may employ the campaign contribution attribution techniques described herein. Example procedures are then described which may be performed in the example environment as well as other environments. Consequently, performance of the example procedures is not limited to the example environment and the example environment is not limited to performance of the example procedures.

Key Terms

The term "campaign" refers to any digital marketing activity. Examples of campaigns are emails, advertisements included on a webpage, and so on.

The term "path" refers to a series of campaigns exposed to at least one user. An example of path "A, B, C" may be a series of emails "A," "B," and "C" sent to a group of users.

The term "conversion" refers to performing an action responsive to exposure to a campaign. Examples of conversions are clicking a link, navigating to a website, purchase of a product or service, and so on.

The term "path dataset" refers to data that describes interaction of a group of users that were exposed to campaigns of a particular path and whether or not conversion occurred. An example of a path dataset describes which users exposed to a path of emails "A," "B," and "C" reached conversion.

The term "first order probability" refers to a likelihood of conversion responsive to exposure to a campaign of a path. An example of a first order probability is that 5% of users reached conversion when exposed to campaign "A" of path "A, B, C."

The term "second order probability" refers to a likelihood of conversion responsive to exposure to a campaign of a path along with another campaign of the path. An example of a second order probability is that 5% of users reached conversion when exposed to campaigns "A" and "B" of path "A, B, C."

The term "third order probability" refers to a likelihood of conversion responsive to exposure to a campaign of a path along with another two campaigns of the path. An example of a third order probability is that 5% of users reached conversion when exposed to campaigns "A," "B," and "C" of path "A, B, C."

The term "campaign contribution" refers to a relative effectiveness attributed to a campaign of a path in achieving conversion. An example of a campaign contribution is 33% for campaign "A" of path "A, B, C" which means that campaign "A" contributed 33% to conversion. Accordingly, campaigns "B" and "C" would have campaign contributions adding to 66% (sum of campaign contributions for the campaigns of a path equal 1).

Example Environment

FIG. 1 is an illustration of an environment 100 in an example implementation that is operable to employ campaign contribution attribution techniques described herein. The computing device may include a processing system having one or more processors and devices (e.g., CPUs, GPUs, microcontrollers, hardware elements, fixed logic devices, etc.), and one or more computer-readable storage media. Thus, the various modules 104, 110, and 112, along with the storage 106, are implemented at least partially in hardware of the computing device 102 and may reside on the computer-readable storage media to be executed by the processing system. Examples of processing systems and computer-readable media can be found in the discussion of the example computing system of FIG. 6.

The processing system of the computing device 102 may retrieve and execute computer-program instructions from the modules 104, 110, and 112, of a computing device to provide a wide range of functionality, including but not limited to gaming, office productivity, email, media management, printing, networking, web-browsing, and so forth. A variety of data and program files related to applications can also be included, examples of which include games files, office documents, multimedia files, emails, data files, web pages, user profile and/or preference data, and so forth.

The computing device 102 is shown as having a communication module 104, which is configured at least partially in hardware of the computing device 102 to communicate with and obtain resources from a service provider system 116 via a network 114. The service provider system 116 is implemented at least partially in hardware (e.g., using one or more servers) to enable the computing device 102 to access and interact with various resources made available by the service provider system 116 via the network 114. One example of a service provider system 116 and associated resources is a marketing data management system such as the Adobe Marketing Cloud™. The service provider system 116 may provide users with a platform to gather marketing data, gain insight on industry customers, build personalized advertising campaigns, and manage content and assets for such campaigns.

The resources made available by the service provider system 116 can include any suitable combination of content and/or services typically made available over a network 114 by one or more service providers, e.g., as part of a web service. For instance, content 118 can include various combinations of text, video, ads, audio, multi-media streams, applications, animations, digital images, webpages, and the like. Content 118 may also comprise data in the form of datasets that the computing device 102 may access, and/or data that the computing device 102 may access via the network 114. For example, content 118 may describe campaign contributions 120. Campaign contributions 120 are attributed to individual campaigns of a path in order to reflect their relative effectiveness Some examples of campaign contributions 120 may comprise contributions of 20%, 30%, and 50% for emails "A," "B," and "C," respectively, of path of emails "A, B, C" that are sent to the client device 122. Content 118 may also include marketing analytics data, campaign performance data, marketing content and assets, marketing media budgeting information, social media tracking data, and/or advertising content alternatives which can be used in real-time personalization of advertisements.

The communication module 104 of the computing device 102 is configured to communicate with and obtain resources from client devices, such as the client device 122, via the network 114. The client device 122 also has a communication module 124, which may provide similar functionality to the communication module 104 of computing device 102. As pictured, the client device 122 also comprises client device user data 126, which is information relating to a user of the client device which may be useable in creating a campaign, for instance. The resources obtained from the client device 122 over the network 114 may include all or part of this client device user data 126, along with any suitable combination of content or services, such as email, documents, videos, digital images, webpages, social networking functionality and content, and the like. Resources obtained from the client device 122 may also comprise data in the form of datasets that the computing device 102 may access, and/or data that the computing device 102 may access to generate datasets which is discussed in more detail below. The computing device 102 may make use of the communication module 104 to communicate with the service provider system 116 and/or the client device 122 via the network 114 through one or more of a cellular network, a PC serial port, a USB port, and wireless connections such as Bluetooth or Wi-Fi, to name a few.

The computing device 102 as illustrated also includes a storage element 106. Storage element 106 is configured to store one or more datasets, such as a path dataset 108. The path dataset 108 describes exposure of users to a particular path and whether or not conversion occurred by the users as a result of this exposure. Any number of datasets corresponding to any number of paths may be stored in storage 106. The path dataset 108 may be obtained in a variety of ways. In one example, the path dataset 108 may comprise information obtained from the service provider system 116 via the network 114 regarding interaction with the content 118. Alternatively or additionally, the path dataset 108 may comprise information obtained directly from one or more client devices 122 via the network 114, such as client device 122, including whether or not the user made a conversion.

The computing device 102 is also shown as having a data configuration module 110. The data configuration module 110 represents functionality implemented at least partially in hardware (e.g., a processing system and computer-readable storage medium) to configure the path dataset 108 stored in the storage element 106 to be in an appropriate format for use by the contribution distribution module 112. For example, datasets or information received from the service provider system 116 and/or the client device 122 may not be in a format that is preferable for analysis by the contribution distribution module 112. Consequently, configuring datasets by the data configuration module 110 may include generating data matrices, such as arranging the datasets in rows for each dataset, for example by campaign and conversions.

The contribution distribution module 112 then computes campaign contributions 120 for each of the campaigns of the path from the path dataset 108 for the path from this configured data. An example of operation of the contribution distribution module 112 is discussed in greater details as follows in relation to FIG. 2.

Figure 2:
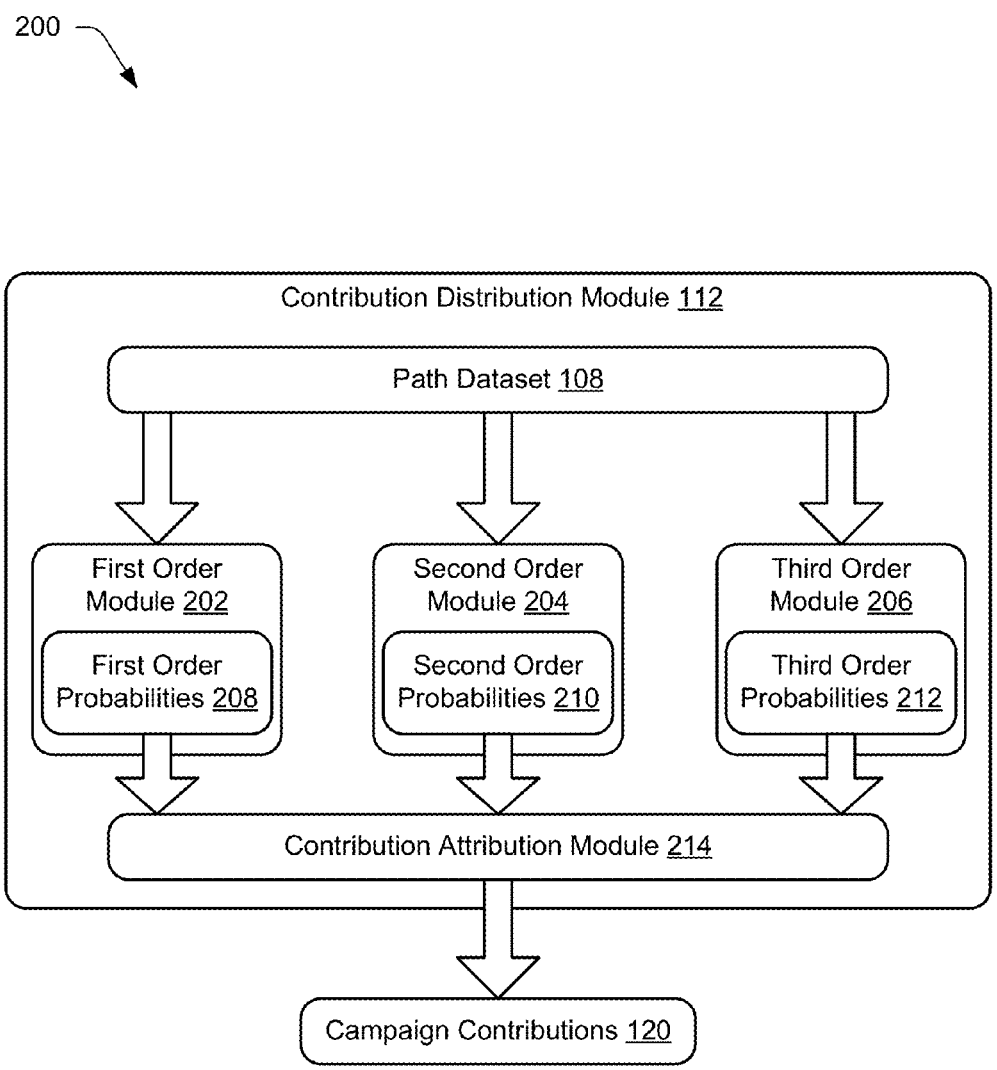
FIG. 2 depicts a contribution distribution system of FIG. 1 in greater detail.

FIG. 2 depicts a system 200 in an example implementation showing operation of the contribution distribution module 112 of FIG. 1 in greater detail. In this example, the contribution distribution module 112 processes the path dataset 108 of FIG. 1 to attribute campaign contributions 120 to campaigns of the path in achieving conversion. Again, the path is determined as a series of campaigns that have been exposed to a group of users. For example, the path may comprise campaigns "x," "y," and "z." Other path datasets corresponding to other paths may be determined from the storage 106, however, a single path corresponding to the path dataset 108, is chosen for analysis that is similar for a group of users and will be referred to as the path below.

The contribution distribution module 112 receives path dataset 108 from storage element 106 of FIG. 1. The path dataset 108, as previously described, describes interaction of a plurality of users with campaigns of the path and whether or not those interactions resulted in conversions. The contribution distribution module 112 is implemented at least partially in hardware to produce campaign contributions 120 for respective campaigns of the path from the path dataset 108.

To do so, the contribution distribution module 112 employs a first order module 202, a second order module 204, and a third order module 206. The first order module 202, implemented at least partially in hardware, is configured to receive the path dataset 108. From the path dataset 108, the first order module 202 determines first order probabilities 208 for each of the campaigns of the path using path dataset 108 corresponding to users that have been exposed to the path. Again, a first order probability represents a likelihood of conversion responsive to exposure to a particular campaign. For example, first order probabilities 208 may include first order probabilities of individual campaigns "x," "y," and "z" of the path, which are indicative of probabilities of conversion when any one of campaigns "x," "y," and "z," respectively are included as part of the path.

The second order module 204, implemented at least partially in hardware, is configured to receive path dataset 108 and determine second order probabilities 210 for each of the campaigns of the path. This determination is again made using path dataset 108 corresponding to users that have been exposed to the path. A second order probability represents a likelihood of conversion responsive to exposure to a particular campaign and another campaign of a path. For example, second order probabilities 210 of campaigns "x," "y," and "z" are indicative of probabilities of conversion when campaigns "x," "y," and "z," respectively, are in the path along with one other campaign of the path. Continuing with the previous example, second order probabilities may include campaigns "y" or "z" along with campaign "x," "x" or "z" along with campaign "y," and "x" or "y" along with campaign "z."

The third order module 206, implemented at least partially in hardware, also receives path dataset 108, and from this, determines third order probabilities 212 for each of the campaigns of the path. A third order probability represents a likelihood of conversion responsive to exposure to a particular campaign and another two campaigns of a path. For example, third order probabilities 212 may comprise third order probabilities of campaigns "x," "y," and "z" which are indicative of probabilities of conversion when any one of campaigns "x," "y," and "z," respectively, are in the path along with two other campaigns of the path. Example of this include "y" and "z" along with campaign "x," "x" and "z" along with campaign "y," and "x" and "y" along with campaign "z".

The contribution distribution module 112 also includes a contribution attribution module 214. The contribution attribution module 214 is implemented at least partially in hardware to utilize the first, second, and third order probabilities 208, 210, and 212 to produce campaign contributions 120 for the campaigns of the path. Campaign contributions are indicative of effectiveness of each of the campaigns of the path in achieving conversion. Continuing with the above example, campaign contributions 120 may be determined to be 0.5, 0.3, and 0.2 for campaigns "x," "y," and "z," respectively. The campaign contributions 120 are output in a user interface such that a user, marketer, or campaign manager may be able to leverage the information. In one example, campaign contributions sum to one enabling comparison of the individual campaigns of the path to each other. Continuing with the previous example, campaign "x" is the most likely candidate to allocate resources to in the future due to it being attributed the highest campaign contribution towards conversion. Thus, the path dataset 108 is used to determine campaign contributions 120 for respective campaigns of the path. This is described mathematically in greater detail in the following section.

Problem Formulation

Figure 3:
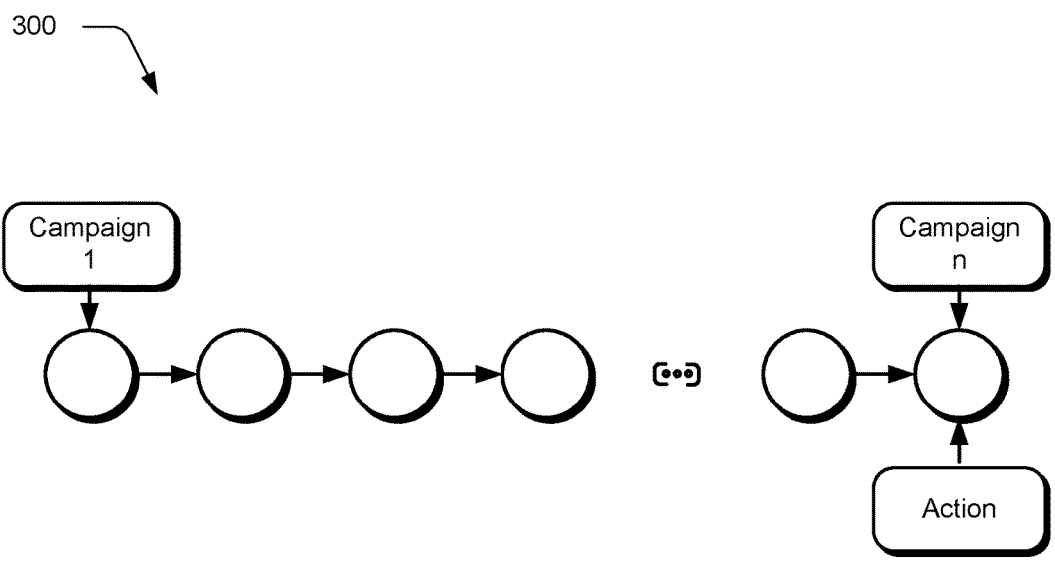
FIG. 3 depicts campaigns of a path that result in conversion.

FIG. 3 illustrates a general path to be analyzed for contribution attribution containing a set of general campaigns that have been exposed to users with a conversion at the end. Campaigns 1-*n* are illustrated from left to right, respectively, with an action or conversion after Campaign n. Two or more campaigns may represent the same campaign sent multiple times, i.e. an email sent multiple times. The order of the campaigns of the path along with different platforms via which a user is exposed to the campaigns may be ignored. For example, different devices (e.g., desktop, mobile phone, tablet, etc.), different browsers (e.g., Internet Explorer®, Chrome®, Firefox®, Safari®, etc.), different email providers (Google®, Yahoo®, MS®, etc.) may be ignored. However, platform dependence may also be incorporated in the analysis without departing from the scope of the disclosure.

Figure 4:
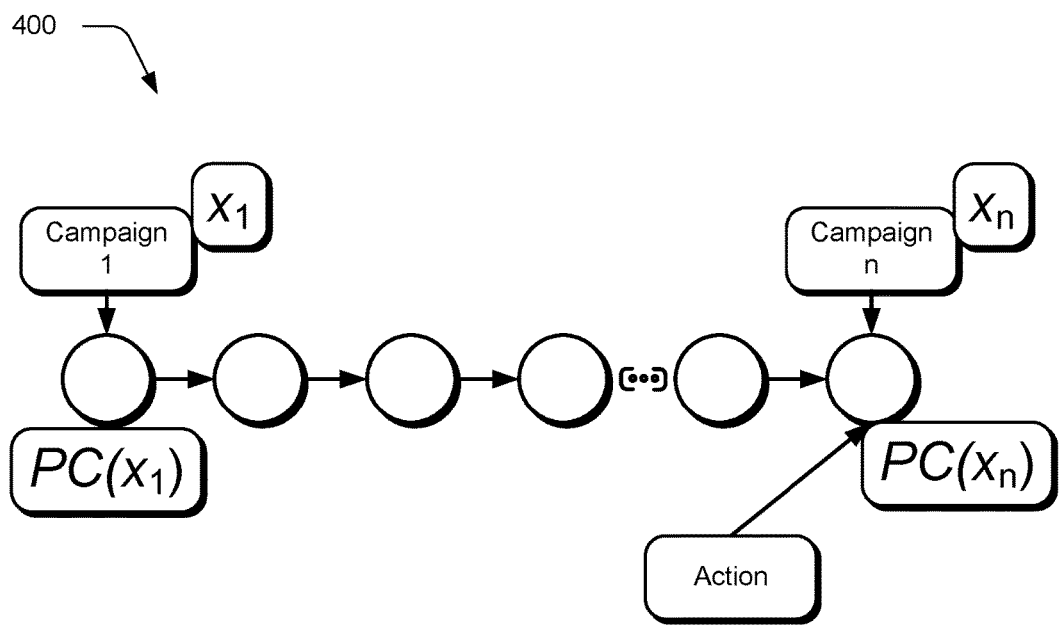
FIG. 4 depicts the campaigns of FIG. 3 with contributions attributed to each campaign.

FIG. 4 illustrates the same path as FIG. 3 with the campaigns labeled as $x_1$ through $x_n$ and attributed contributions for the respective campaigns labeled as $PC(x_1)$ through $PC(x_n)$.

For any path, there are two possible outcomes at the end of the path: taking a desired action (i.e., conversion) or not taking a desired action (i.e., no conversion). These outcomes are denoted as Y=1 for conversion and Y=0 for "no conversion" in the following. The contributions in achieving conversion, $PC(x_1)$ through $PC(x_n)$ (also known as partial credit or PC), are attributed to the respective nodes $x_1$ through $x_n$. The contributions are normalized such that a sum of the contributions attributed to the campaigns of a path equal one. Thus, the contributions attributed to the campaigns of a path can be summarized as:

$$\Sigma_i PC(x_i) = 1 \quad (1)$$

where $x_i$ is a campaign of the path, with r=1:n with n being the number of campaigns in the path, and PC being the contribution attributed to campaign $x_i$.

A contribution for a campaign comprises a sum of all of its contributions from first, second, and third order probabilities, as described above. Thus, a contribution for a single campaign can be summarized as:

$$PC(x_i) = \Sigma_j \mu_j PC(x_i)_j \quad (2)$$

where j is the order of contribution (first, second, or third order probability) of i-th campaign and $\mu_j$ is the corresponding coefficient.

Probability Determination

The first order probability is a contribution that the presence of a campaign makes towards conversion when the campaign is present in the path. This is summarized as:

$$Prob(Y = 1 \mid x_i) = \frac{TP(x_i)}{TP(x_i) + TN(x_i)} \quad (3)$$

where $TP(x_i)$ is the total number of times $x_i$ is present in a path with conversion and $TN(x_i)$ is the total number of times $x_i$ is present in a path with no conversion.

The second order probability is a contribution that the presence of a campaign makes towards conversion when the campaign is present in the path along with one other campaign. This is summarized as:

$$\frac{1}{(n-1)} \sum_{j \neq i} prob(Y = 1 \mid x_i, x_j) \quad (4)$$

where $$Prob(Y = 1 \mid x_i, x_j) = \frac{TP(x_i, x_j)}{TP(x_i, x_j) + TN(x_i, x_j)} \quad (5)$$

and $TP(x_i, x_j)$ is the total number of times $x_i$ and $x_j$ are present simultaneously in a path with conversion and $TN(x_i,$ $x_j$) is the total number of times $x_i$ and $x_j$ are present simultaneously in a path with no conversion. The coefficient $$\frac{1}{(n-1)}$$

is to discount for multiplicity of the campaign being counted for.

The third order probability is a contribution that the presence of a campaign makes towards conversion when the campaign is present in the path along with two other campaigns. This is summarized as:

$$\frac{1}{(n-2)}\sum_{j\neq i\neq k} prob(Y=1 \mid x_i, x_j, x_k) \quad (6)$$

where $$Prob(Y=1 \mid x_i, x_j, x_k) = \frac{TP(x_i, x_j, x_k)}{TP(x_i, x_j, x_k) + TN(x_i, x_j, x_k)} \quad (7)$$

and $TP(x_i, x_j, x_k)$ is the total number of times $x_i$, $x_j$, and $x_k$ are present simultaneously in a path with conversion and $TN(x_i, x_j, x_k)$ is the total number of times $x_i$, $x_j$, and $x_k$ are present simultaneously in a path with no conversion. The coefficient $$\frac{1}{(n-1)}$$

is to discount for multiplicity of the campaign being counted for.

Contribution Attribution

As discussed above the first, second, and third order probabilities are used to attribute contributions to individual campaigns. Thus (2) becomes:

$$PC(x_i) = \sum_j \mu_j PC(x_i)_j = \quad (8)$$
$$\frac{1}{min}\left[prob(Y=1 \mid x_i) + \frac{1}{(n-1)}\sum_{j\neq i} prob(Y=1 \mid x_i, x_j) + \frac{1}{(n-2)}\sum_{j\neq i\neq k} prob(Y=1 \mid x_i, x_j, x_k)\right]$$

where m is the number of order of contributions considered and n is the total number of campaigns in a path, with m≤n.

Single User Example

In this example, a path is analyzed that contains three campaigns ($x_1$, $x_2$, and $x_3$) with a conversion after $x_3$ to determine contributions for each of the campaigns in achieving the conversion. This example is of a single user, thus TP is one and TN is zero because a conversion occurred and no other user data is present.

Using (3) the first order probabilities become:

Prob($Y=1 \mid x_1$)=1

Prob($Y=1 \mid x_2$)=1

Prob($Y=1 \mid x_3$)=1

Similarly, using (4) and (5), the second order probabilities become:

$$\frac{1}{(n-1)}\sum_{j\neq 1} prob(Y=1 \mid x_1, x_j) = \frac{1}{(3-1)}(1+1) = 1$$

$$\frac{1}{(n-1)}\sum_{j\neq 2} prob(Y=1 \mid x_2, x_j) = \frac{1}{(3-1)}(1+1) = 1$$

$$\frac{1}{(n-1)}\sum_{j\neq 3} prob(Y=1 \mid x_3, x_j) = \frac{1}{(3-1)}(1+1) = 1$$

Also, using (6) and (7), the first order probabilities become (same for all three campaigns):

$$\frac{1}{(n-2)}\sum_{j\neq i\neq k} prob(Y=1 \mid x_1, x_j, x_k) = \frac{1}{(3-2)}(1) = 1$$

Finally, using (8), the contributions are attributed to the campaigns as follows:

$$PC(x_1) = \sum_j \mu_j PC(x_1)_j = \frac{1}{3(3)}(1+1+1) = \frac{1}{3}$$

$$PC(x_2) = \sum_j \mu_j PC(x_2)_j = \frac{1}{3(3)}(1+1+1) = \frac{1}{3}$$

$$PC(x_3) = \sum_j \mu_j PC(x_3)_j = \frac{1}{3(3)}(1+1+1) = \frac{1}{3}$$

As a check, (1) is used to ensure that all contributions sum to one:

$$\sum_i PC(x_i) = \frac{1}{3} + \frac{1}{3} + \frac{1}{3} = 1$$

Forecast Model Evaluation

To evaluate the contribution distribution model using first, second, and third order probabilities, a sample data set is used regarding a particular path that users have been exposed to. The dataset comprises 1000 observations collected over a period of two months including a total number of campaigns of the path the users had been exposed to during the time period. The users either made conversions or they did not at the end of the path.

In general, there are two possible ways of verifying the model. One way is to treat the contribution attribution model as a classification problem where the output is—as an example—a bivariate variable of 1 and 0 (1 for user converting and 0 for not converting). The other model is to treat the attribution model as a continuous problem with the partial credit computation as the major focus for the purpose of testing the model. This invention uses the latter option and uses cross validation as the algorithm for model testing. Cross validation is more accurate than traditional techniques.

Example Procedure

Figure 5:
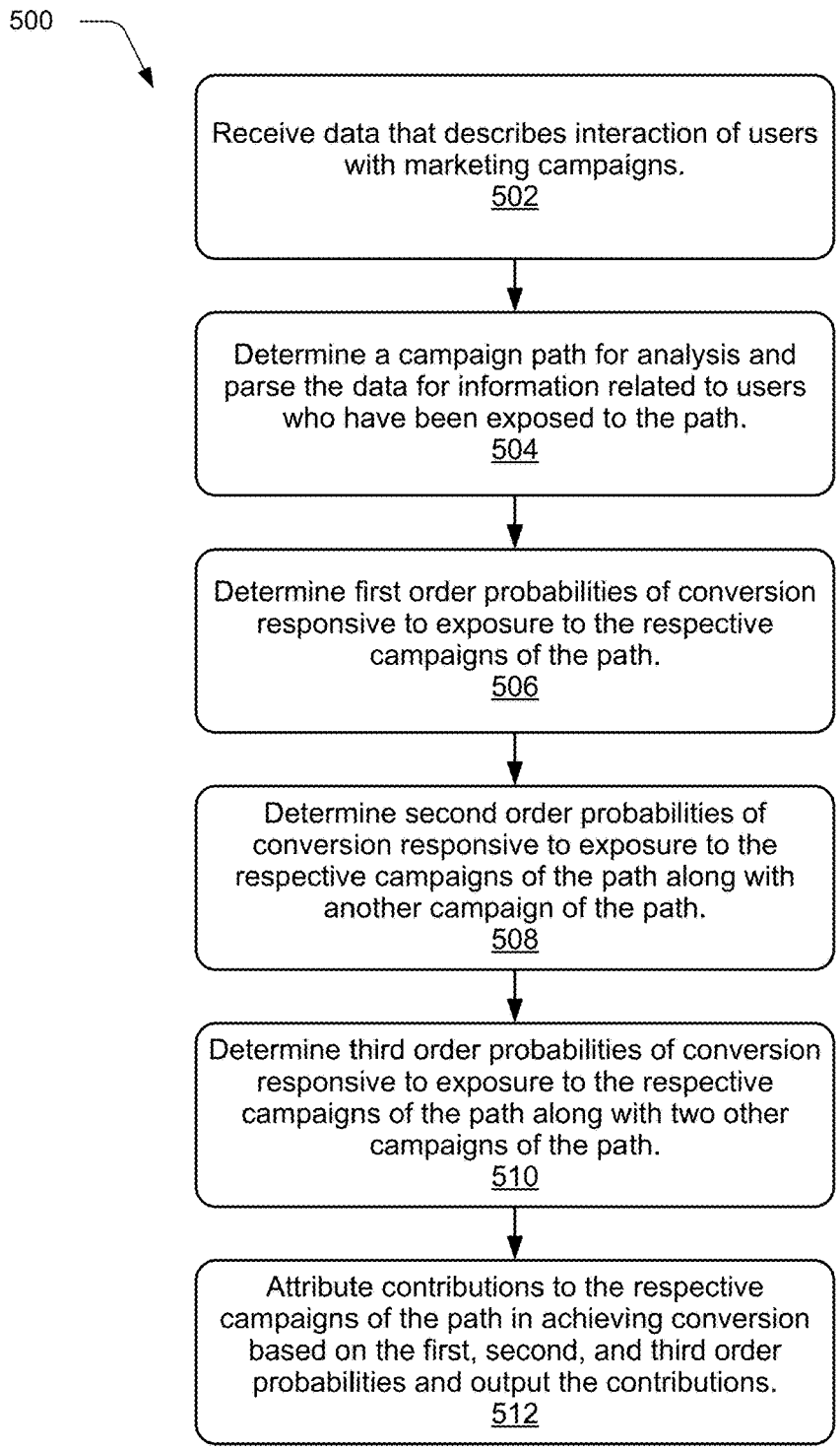
FIG. 5 is a flow diagram depicting a procedure in an example implementation in which contributions are attributed to campaigns of a path in achieving conversion based on first, second, and third order probabilities.

FIG. 5 is a flow diagram depicting a procedure 500 in an example implementation in which contributions are attributed to campaigns of a path based upon first, second, and third order probabilities of a user making a conversion. At 502, data describing interactions of users with marking campaigns are received. The data describes which users were exposed to which campaigns and whether or not that exposure resulted in conversion by the users.

At 504, a campaign path is chosen for analysis that includes a specific set of campaigns. Once a path is selected, the data describing the interactions is parsed to isolate information regarding users who were exposed to the path.

At 506, first order probabilities are calculated for each of the campaigns of the path using the parsed data. Again, a first order probability for a campaign represents a likelihood of conversion responsive to exposure to the campaign.

At 508, second order probabilities are calculated for each of the campaigns of the path using the parsed data. A second order probability for a campaign represents a likelihood of conversion responsive to exposure to the campaign and another campaign of the path.

At 510, third order probabilities are calculated for each of the campaigns of the path using the parsed data. A third order probability for a campaign represents a likelihood of conversion responsive to exposure to the campaign and another two campaigns of the path.

Finally, at 512, contributions are attributed to the campaigns of the path based upon the first, second, and third order probabilities for the respective campaigns. The contributions may then be output for display in a user interface such that a user, marketer, or campaign manager may be able to determine a relative effectiveness of one or more of the campaigns of the path in achieving conversion.

Example System and Device

Figure 6:
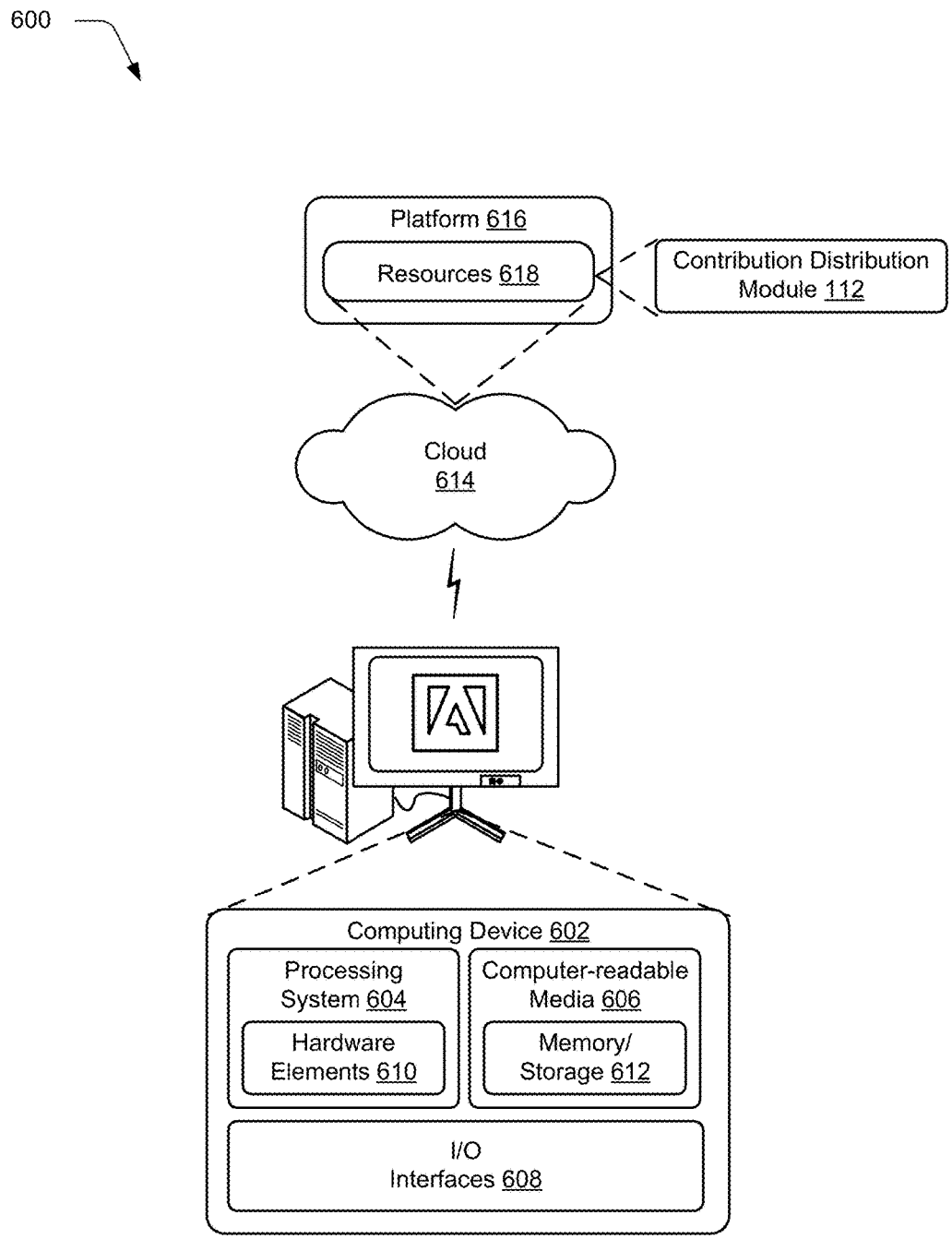
FIG. 6 illustrates an example system including various components of an example device that can be implemented as any type of computing device as described and/or utilize

FIG. 6 illustrates an example system generally at 600 that includes an example computing device 602 that is representative of one or more computing systems and/or devices that may implement the various techniques described herein. This is illustrated through inclusion of the contribution distribution module 112, which may be configured to attribute contributions to campaigns in achieving an action or conversion. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital marketing environment to attribute a contribution of a particular digital marketing campaign towards conversion, a method implemented by at least one computing device, the method comprising:
    collecting, by the at least one computing device, data that describes interaction of a plurality of users with a plurality of digital marketing campaigns that include the particular digital marketing campaign, the data also describing whether conversion occurred by respective ones of the plurality of users;
    determining, by the at least one computing device, a first order probability of the particular digital marketing campaign from the collected data, the first order probability indicative of a likelihood of conversion responsive to exposure to the particular digital marketing campaign;
    determining, by the at least one computing device, a second order probability of the particular digital marketing campaign from the collected data, the second order probability indicative of a likelihood of conversion responsive to exposure to the particular digital marketing campaign and another digital marketing campaign of the plurality of digital marketing campaigns, the determining including a term that discounts multiplicity of counts of the particular digital marketing campaign in the second order probability;
    determining, by the at least one computing device, a third order probability of the particular digital marketing campaign from the collected data, the third order probability indicative of a likelihood of conversion responsive to exposure to the particular digital marketing campaign with two other digital marketing campaigns of the plurality of digital marketing campaigns, the determining including a term that discounts multiplicity of counts of the particular digital marketing campaign in the third order probability; and
    generating, by the at least one computing device, digital content attributing the contribution to the particular digital marketing campaign towards conversion, the contribution based on the first, second and third order probabilities.

2. The method as described in claim 1, wherein the determining of the first order probability, the determining of the second order probability, the determining of the third order probability, and the generating of the digital content attributing the contribution are repeated for each of the digital marketing campaigns that are not the particular digital marketing campaign.

3. The method as described in claim 2, wherein a sum of the contributions attributed to the plurality of digital marketing campaigns towards conversion equals one.

4. The method as described in claim 2, further comprising comparing the contributions of the digital marketing campaigns against each other to determine a relative effectiveness of each of the digital marketing campaigns in achieving the conversion.

5. The method as described in claim 1, wherein the first order probability is based on a number of said conversions relative to a number of non-conversions by the users responsive to exposure to the particular digital marketing campaign.

6. The method as described in claim 1, wherein the second order probability is based on a number of conversions relative to a number of non-conversions by the users responsive to exposure to the particular digital marketing campaign and the other digital marketing campaign.

7. The method as described in claim 1, wherein at least one of the digital marketing campaigns is an email.

8. The method as described in claim 1, wherein at least one of the digital marketing campaigns is an advertisement included on a webpage.

9. The method as described in claim 1, wherein the conversion includes navigation to a web site or purchase of a product or service.

10. In a digital marketing environment to attribute contributions in achieving conversion of a plurality of digital marketing campaigns that are exposed to a plurality of users, a system comprising:
    a contribution distribution module implemented at least partially in hardware to generate digital content attributing contributions to the digital marketing campaigns in achieving the conversion based on first, second and third order probabilities, the contribution distribution module comprising:
        a first order module implemented at least partially in hardware to determine the first order probabilities of the digital marketing campaigns using data that describes interaction of the users with the digital marketing campaigns and whether conversion occurred by respective ones of the users, the first order probabilities indicative of likelihoods of conversion responsive to exposure to respective said digital marketing campaigns;
        a second order module implemented at least partially in hardware to determine the second order probabilities of the digital marketing campaigns using the data, the second order probabilities indicative of likelihoods of conversion responsive to exposure to the respective said digital marketing campaigns in conjunction with another digital marketing campaign of the digital marketing campaigns, the second order probabilities determined using a term that discounts multiplicity of counts of the respective said digital marketing campaigns to respective said second order probabilities; and
        a third order module implemented at least partially in hardware to determine the third order probabilities of the digital marketing campaigns using the data, the third order probabilities indicative of likelihoods of conversion responsive to exposure to the respective said digital marketing campaigns in conjunction with two other digital marketing campaigns of the plurality of digital marketing campaigns, the third order probabilities determined using a term that discounts multiplicity of counts of the respective said digital marketing campaigns to respective said third order probabilities.

11. The system as described in claim 10, wherein the conversion includes navigations to a web site or purchases of a product or service.

12. The system as described in claim 10, wherein at least one of the digital marketing campaigns is an email.

13. The system as described in claim 10, wherein at least one of the digital marketing campaigns is an advertisement included on a webpage.

14. The system as described in claim 10, wherein the attributed contributions are indicative of relative effectiveness of the respective said digital marketing campaigns in achieving the conversion.

15. The system as described in claim 10, wherein a sum of the contributions attributed to the digital marketing campaigns equals one.

16. The system as described in claim 10, wherein the data describes which of the users interacted with which ones of the digital marketing campaigns and, if conversions occurred by respective ones of the users, when the conversions occurred by the respective ones of the users.

17. One or more computer-readable storage media that are non-transitory and comprising instructions stored thereon that, responsive to execution by a computing device, causes the computing device to attribute a contribution to a particular digital marketing campaign in achieving conversion, the contribution attributed by performing operations comprising:
    determining a first order probability of the particular digital marketing campaign from data that describes interaction of a plurality of users with a plurality of digital marketing campaigns that includes the particular digital marketing campaign, the first order probability indicative of a likelihood of conversion responsive to exposure to the particular digital marketing campaign;
    determining a second order probability of the particular digital marketing campaign from the data, the second order probability indicative of a likelihood of conversion responsive to exposure to the particular digital marketing campaign and another digital marketing campaign of the plurality of digital marketing campaigns, the determining including a term that discounts multiplicity of counts of the particular digital marketing campaign in the second order probability;
    determining a third order probability of the particular digital marketing campaign from the collected data, the third order probability indicative of a likelihood of conversion responsive to exposure to the particular digital marketing campaign with two other digital marketing campaigns of the plurality of digital marketing campaigns, the determining including a term that discounts multiplicity of counts of the particular digital marketing campaign in the third order probability; and
    generating digital content attributing the contribution to the particular digital marketing campaign in achieving conversion, the contribution based on the first, second, and third order probabilities.

18. The one or more computer-readable storage media as described in claim 17, wherein the determining the first order probability, the determining the second order probability, the determining the third order probability, and the generating the digital content are repeated for each of the plurality of digital marketing campaigns.

19. The one or more computer-readable storage media as described in claim 18, wherein the contributions attributed to the plurality of digital marketing campaigns sum to one.

20. The one or more computer-readable storage media as described in claim 17, the operations further comprising comparing the contributions of the digital marketing campaigns against each other to determine a relative effectiveness of each of the digital marketing campaigns in achieving the conversion.

* * * * *